(12) United States Patent
Lee et al.

(10) Patent No.: US 10,484,084 B2
(45) Date of Patent: Nov. 19, 2019

(54) METHOD AND SYSTEM TO INCREASE CAPACITY OF HIGH THROUGHPUT SATELLITE COMMUNICATION

(71) Applicants: Lin-Nan Lee, Potomac, MD (US); Mustafa Eroz, Germantown, MD (US)

(72) Inventors: Lin-Nan Lee, Potomac, MD (US); Mustafa Eroz, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 545 days.

(21) Appl. No.: 15/146,669

(22) Filed: May 4, 2016

(65) Prior Publication Data
US 2017/0324468 A1 Nov. 9, 2017

(51) Int. Cl.
*H04B 7/185* (2006.01)
*H04L 1/00* (2006.01)

(52) U.S. Cl.
CPC ....... *H04B 7/18582* (2013.01); *H04B 7/1858* (2013.01); *H04B 7/18508* (2013.01); *H04B 7/18528* (2013.01); *H04L 1/0034* (2013.01); *H04L 1/0042* (2013.01); *H04L 1/0057* (2013.01); *H04B 7/18517* (2013.01)

(58) Field of Classification Search
CPC ................................................. H04B 7/18517
See application file for complete search history.

(56) References Cited

U.S. PATENT DOCUMENTS

| 9,847,851 B2 * | 12/2017 | Mouhouche | ....... H03M 13/1165 |
| 9,912,356 B2 * | 3/2018 | Myung | ................ H05K 999/99 |
| 2003/0027568 A1 | 2/2003 | Berger | |
| 2004/0022275 A1 | 2/2004 | Blanchard | |
| 2008/0018802 A1 * | 1/2008 | Yu | .......................... H04H 40/90 348/728 |
| 2008/0233952 A1 * | 9/2008 | Miller | ................ H04B 7/18523 455/427 |
| 2009/0022085 A1 * | 1/2009 | Dankberg | .......... H04B 7/18582 370/316 |
| 2010/0195563 A1 * | 8/2010 | Jong | .................. H04B 7/18513 370/321 |

(Continued)

FOREIGN PATENT DOCUMENTS

EP 1976154 A2 10/2008

OTHER PUBLICATIONS

International search report from corresponding PCT application PCT/US2017/030307.

*Primary Examiner* — Edan Orgad
*Assistant Examiner* — Emmanuel K Maglo
(74) *Attorney, Agent, or Firm* — Capitol City Techlaw; Jasbir Singh

(57) ABSTRACT

A method and system for providing high throughput communications via a Radio Frequency (RF) satellite are disclosed. The method includes providing a plurality of information bit streams intended for a plurality of downlinks; modulating an uplink stream including the plurality of information bit streams with an uplink modulation scheme to generate an uplink signal; transmitting the uplink signal to the satellite; and partitioning, at the satellite, the uplink signal into a plurality of downlink signals, each one intended for one of the plurality of downlinks. In the method, the uplink stream includes the plurality of information bit streams.

14 Claims, 4 Drawing Sheets

(56) References Cited

U.S. PATENT DOCUMENTS

| | | | |
|---|---|---|---|
| 2010/0234071 A1* | 9/2010 | Shabtay | H04B 7/0408 |
| | | | 455/562.1 |
| 2011/0143654 A1* | 6/2011 | Mukhija | H04B 7/18513 |
| | | | 455/9 |
| 2011/0269396 A1* | 11/2011 | Beeler | H04B 7/18515 |
| | | | 455/9 |
| 2012/0051284 A1 | 3/2012 | Chang | |
| 2013/0154755 A1* | 6/2013 | Eroz | H04L 1/004 |
| | | | 332/144 |
| 2014/0229800 A1* | 8/2014 | Eroz | H03M 13/13 |
| | | | 714/776 |
| 2015/0373715 A1* | 12/2015 | Kliger | H04W 52/18 |
| | | | 370/329 |
| 2016/0028496 A1* | 1/2016 | Currivan | H04B 17/18 |
| | | | 375/222 |
| 2016/0156498 A1* | 6/2016 | Loghin | H04L 1/0042 |
| | | | 375/298 |

\* cited by examiner

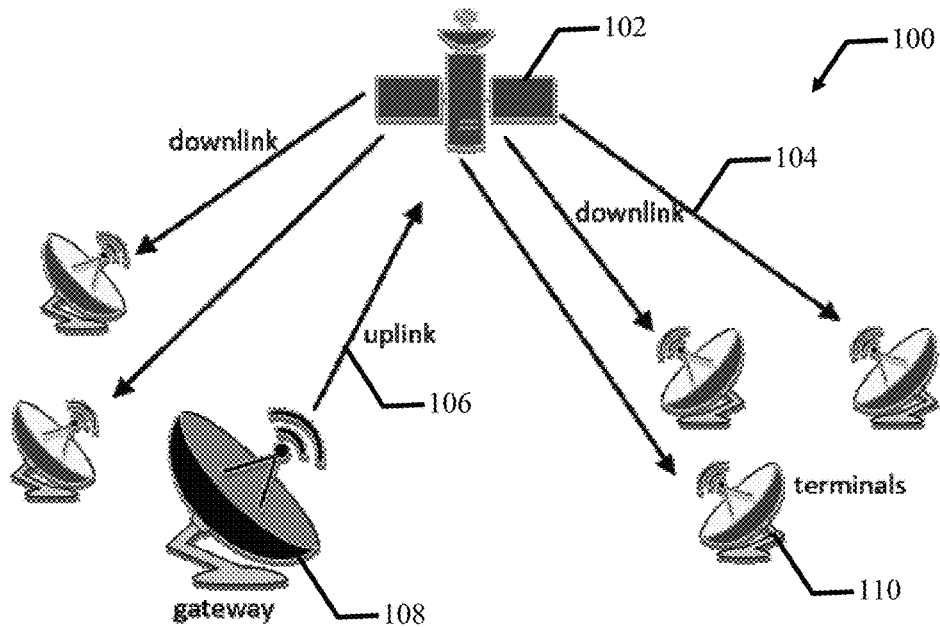
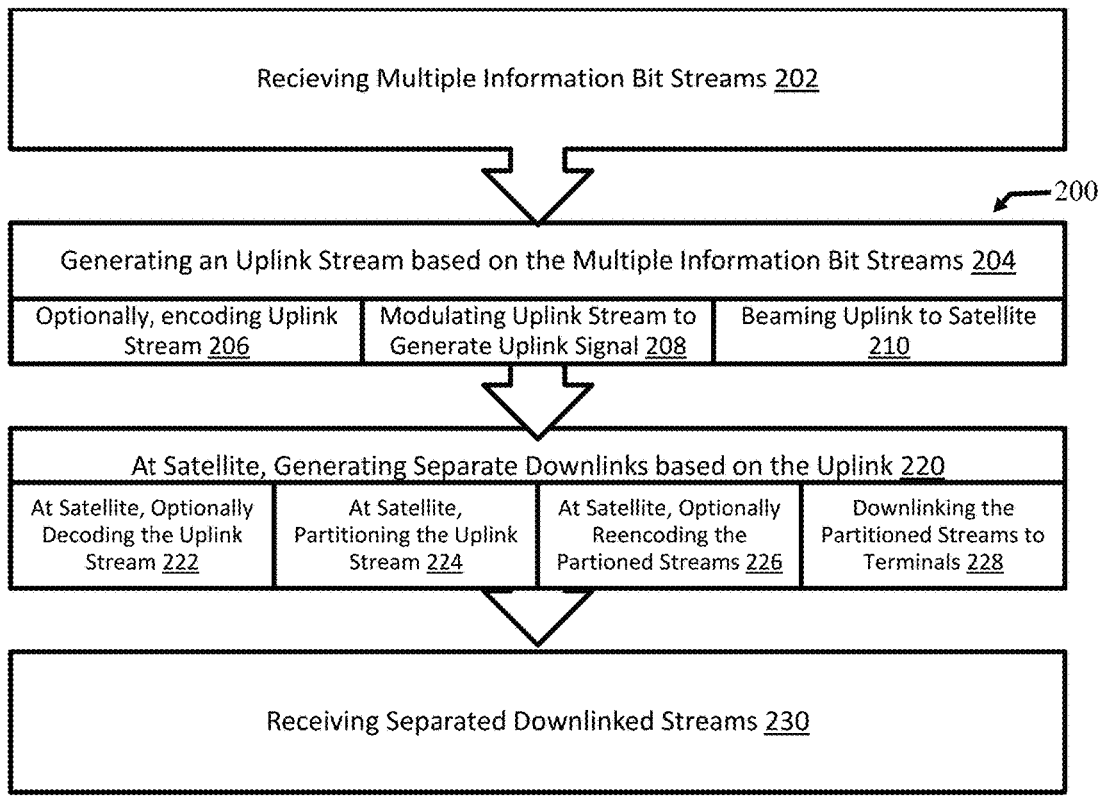

_US 10,484,084 B2_

METHOD AND SYSTEM TO INCREASE CAPACITY OF HIGH THROUGHPUT SATELLITE COMMUNICATION

FIELD

The present disclosure relates to a method and a system for using a spectrally efficient coding/modulation for information in the high Signal-to-Noise Ratio (SNR) uplink portion of a bent-pipe relay, and partitioning the information into multiple downlink carriers after relative simple processing in the satellite. In exemplary embodiments, a single gateway can be used to source data otherwise requiring a plural number of gateways without processing in the satellite.

BACKGROUND

A multi-beam High-Throughput Satellite (HTS) employs multiple gateways to source forward link data to different user beams in the uplink, with the gateways using a frequency band that is not used by the user beams. The most straightforward satellite architecture uses repeaters. In such architectures, the satellite capacity equals to the sum of bandwidth used by all the gateways communicating with the satellite. The gateways must be geographically separated from one another to avoid mutual interference, and the satellite capacity is therefore limited by the number of gateways that can be realistically placed in a geographical area. Significant cost savings can be realized by reducing the number of gateways used to deliver a similar total satellite capacity using the present teachings. Furthermore, the present teachings can increase total capacity for a satellite by using all the gateway locations available, as the number of gateway locations available to a satellite provider can often be the primary limitation with repeater architecture.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A method for providing high throughput communications via a Radio Frequency (RF) satellite is disclosed. The method includes: providing a plurality of information bit streams intended for a plurality of downlinks; modulating an uplink stream including the plurality of information bit streams with an uplink modulation scheme to generate an uplink signal; transmitting the uplink signal to the satellite; and partitioning, at the relay, the uplink signal into a plurality of downlink signals, each one intended for one of the plurality of downlinks. In the method, the uplink stream includes the plurality of information bit streams.

A system to provide high throughput communications via a Radio Frequency (RF) satellite is disclosed. The system includes: a receiver to receive a plurality of information bit streams intended for a plurality of downlinks; a modulator to modulate an uplink stream including the plurality of information bit streams with an uplink modulation scheme to generate an uplink signal; a transmitter to transmit the uplink signal to the satellite; and a de-multiplexor, at the satellite, to partition the uplink signal into a plurality of downlink signals, each one of the downlink signals intended for one of the plurality of downlinks. In the system, the uplink stream includes the plurality of information bit streams.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof that are illustrated in the appended drawings. Understanding that these drawings depict only typical embodiments and are not therefore to be considered to be limiting of its scope, implementations will be described and explained with additional specificity and detail with the accompanying drawings.

FIG. 1 illustrates a block diagram of a communications system including an uplink and a downlink according to various embodiments.

FIG. 2 is a flowchart of an exemplary method that may implement an embodiment of the invention.

DETAILED DESCRIPTION

Figure 3:
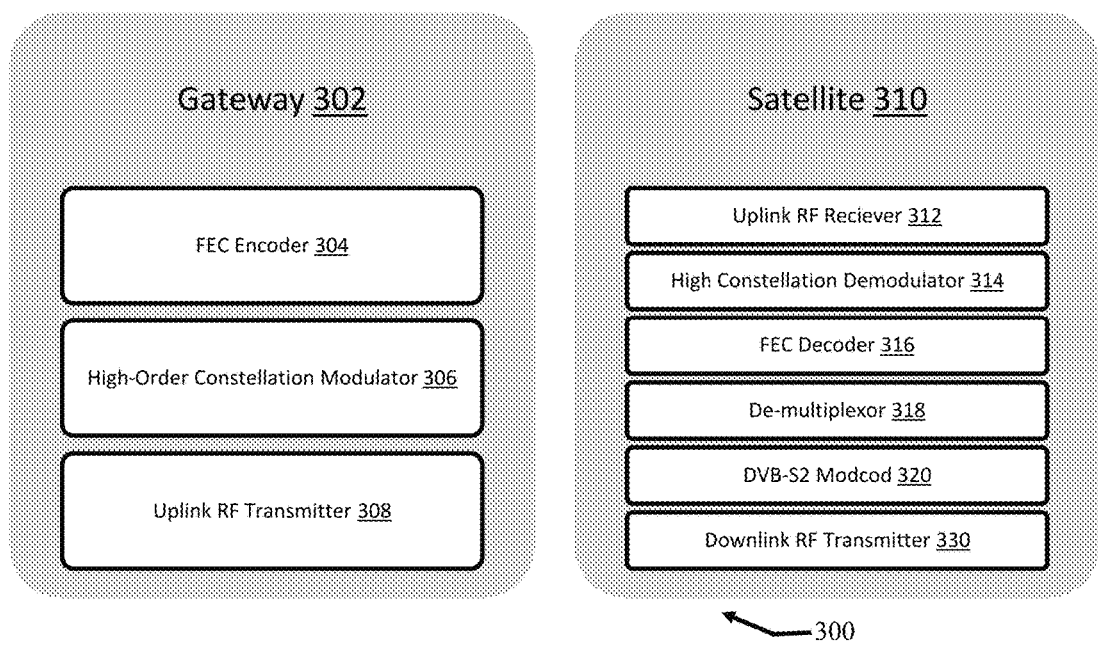
FIG. 3 illustrates a block diagram of a communication system that uses a high-order constellation modulator and Forward Error Correction (FEC) for a gateway to a satellite link, according to various embodiments.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included either to identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present disclosure relates to a method and a system for using a high signal to noise ratio in an uplink portion of a forward link to encode information bits or data using a high-order constellation modulation. According to various embodiments, a forward link may be modulated with a high-order constellation and multiple gateway worth of data may be transmitted to a relay transceiver, such as a satellite, using a single gateway. In exemplary embodiments, the information bits are transferred to a plurality of traditional constellations on the satellite for downlink transmission.

In some embodiments, the satellite may Forward Error Correction (FEC) decode the information bits prior to separating and transferring the information bits into constellations that are more traditional. In some embodiments, the satellite may separate the information bits into more traditional constellations without FEC decoding on the satellite.

Forward Error Correcting (FEC) codes deploying highly efficient constellations, such as 1024 symbol Amplitude and Phase-Shift Keying or Amplitude Phase-Shift Keying (APSK), can be used on a link having a high signal to noise ratio to increase the link's capacity or throughput. Various embodiments that take into consideration the important size weight and power (SWAP) limitation are disclosed. Several embodiments, for example, when simpler hardware for the satellite is desired to minimize on-board processing, that offer a somewhat lower performance is also described.

The present teachings disclose using a spectrally efficient coding/modulation for information in the high Signal-to-Noise Ratio (SNR) uplink portion of a bent-pipe relay, and partition the information into multiple downlink carriers after on board processing in the satellite. In exemplary embodiments, a reduced number of gateways can be used as multiple carriers' worth of data is sent from a single gateway for relaying.

FIG. 1 illustrates a block diagram of a communications system including an uplink and a downlink according to various embodiments.

FIG. 1 depicts a high-capacity satellite communications system 100. The high-capacity satellite communications system may include a satellite 102, a gateway 108 and a Very Small Aperture Terminal (VSAT) population 110. The gateway 108 may be disposed at a satellite control facility. The gateway 108 may include a number of hubs or gateways. The gateway 108 may be connected to the VSATs in the VSAT population 110 through the satellite 102. A feeder link may carry data between the gateway 108 and the satellite 102. The feeder links is also referred to as an uplink 106 for transmitting data from the gateway 108 to the satellite 102. The communication path also includes a downlink 104 for transmitting data from the satellite 102 to the VSAT population 110.

The gateway 108 may be high capacity, large antenna earth stations with connectivity to ground telecommunications infrastructure. The gateway 108 may include a transceiver, a demodulator, a decoder, an encoder and a modulator. Those skilled in the art will recognize that the present description does not preclude other configurations of satellites and VSATs.

The VSAT population 110 may include a number of VSATs, which may be used by end users to access the satellite communications system. A VSAT may include a remote satellite dish for receiving RF signals from and transmitting RF signals to the satellite 102, a satellite modem and other equipment for managing the sending and receiving of data. The VSAT may include a demodulator, a decoder, an encoder and a modulator. The VSAT may be connected to one or more remote hosts that may be computer systems or other electronic devices capable of network communications at a site remote from the VSAT via the gateway 108. For example, a VSAT may be used at a residence or place of business to provide access to the Internet. The satellite 102 may be any suitable communications satellite for connecting the gateway 108 to the remote hosts connected to a VSAT in the VSAT population 110.

For example, the satellite 102 may be a simple bent-pipe design geostationary satellite, which can accommodate innovations and variations in transmission parameters, operating in the Ka-band or any other suitable frequency band. Signals passing from the satellite 102 in the downlink 104, towards the VSAT population 110$s$, may be based on the DVB S.2 standard (ETSI EN 302 307) using signal constellations including at least 16-ary Amplitude and Phase Shifted Keying (16-APSK). The signals intended to be sent to the satellite 102 in the uplink, toward the satellite, may be based on the constellations greater than or equal to 16-APSK. Other suitable signal types may also be used in either direction, including, for example higher data rate variations of DVB S2.

The gateway 108 may be connected to the Internet. Remote terminals connected to VSATs in the VSAT population 110 may connect to the Internet through the satellite 102 and the gateway 108.

The satellite 102 may be responsible for providing access to the satellite communications system to more than one VSAT from the VSAT population 110.

In exemplary embodiments, the gateway 108 provides a hub terminal including an outdoor transceiver and antenna, indoor integrated modem and multiplexing systems, an inter-facility link, and a variety of network interfaces that may simultaneously deliver traffic to a network backbone, for example, in TDM, ATM, and IP formats. Gateway components may be provisioned for 1:N (e.g., N=4) or any other active redundancy configurations. In exemplary embodiments, the satellite hub can include a router/gateway functionality therein. The satellite hub router/gateway functionality can route IP datagrams between a space link and a standard network interface, for example, a network backbone, an Ethernet interface, a Wi-Fi interface, and the like.

The transmission on the uplink and the downlink usually employs some kind of Forward Error Correcting (FEC) coding technology to prevent the need to re-transmit information every time an error occurs. The strength of the FEC needed is a function of the raw error rates of the networking system, and the acceptable output error rate of the final solution. FEC technologiess like Bose-Chaudhuri-Hocquenghem (BCH) codes, Reed-Solomon (RS) codes, and Low-Density Parity Check (LDPC) codes are known. Generally, LDPC is more robust than BCH and RS, but LDPC requires much more computational resources than BCH and RS to decode. According to various embodiments, the present teachings utilize an FEC technology that provides an acceptable output error rate for a given modulation constellation and SWAP needs. For example, when using a high-order constellation, a more robust ECC like LDPC may be used. According to various embodiments, two ECC technologies may be concatenated, like BCH and LDPC.

FIG. 2 is a flowchart of an exemplary method that may implement an embodiment of the invention.

FIG. 2 illustrates a method 200 that may be implemented in a communications system. Method 200 may be implemented in part on a gateway 202, a satellite 204 and a VSAT 206, in an embodiment. According to various embodiments, method 200 may be implemented differently.

Method 200 includes a function 202 for receiving multiple information bit streams. In exemplary embodiments, the function 202 for receiving multiple information bit streams may be performed at a gateway or hub location.

Method 200 may include a function 204 for generating an uplink stream based on the multiple streams. In some embodiments, the function 204 may generate the uplink stream by interleaving the multiple streams into the uplink stream. In some embodiments, the function 204 may buffer each of the multiple streams and dispose the buffered data of each of the streams into a sub-frame or the like apportioned into the uplink stream.

Method 200 may optionally include a function 206 for encoding the uplink stream. In some embodiments, the uplink stream may not be encoded; instead, each of the information bit streams that are combined to form the uplink stream are individually FEC encoded. The individual encoding may account for degradation of the encoded information bit stream being transmitted over both an uplink with a first Signal-to-Noise Ratio (SNR) and at a downlink with a second SNR. The combining of such information bit streams, to generate an uplink stream, may place them different channels of a modulation scheme, for example, a 64-ary Quadrature Amplitude Modulation (64-QAM) modulation scheme performed by function 208. In some embodiments, the encoding of the uplink stream may be performed using a Forward Error Correcting (FEC) encoder. In exemplary embodiments, the encoding can include LDPC, BCH, and other FEC formats known in the art.

Method 200 may include a function 208 for modulating the uplink stream. According to various embodiments, the selected modulation scheme provides spectrally efficient coding/modulation for information in the high Signal-to-Noise Ratio (SNR) uplink. The uplink modulation scheme provides a higher capacity uplink signal as compared to a downlink signal. In exemplary embodiments, modulating of the uplink stream may be performed using a high-order constellation, for example, with a 1024-ary APSK modulator. Such a high constellation modulator for the uplink may provide three to six times the information capacity as compared to the modulator used for the downlink. Some modulators, such as the 1024-APSK modulator, would need a complementary de-modulator prior to partitioning of the uplink stream, for example, at a satellite.

In exemplary embodiments, the modulation of the uplink stream at function 208 may be performed using a modulator that combines multiple channels/signals into one channel/signal, such as, a Quadrature Amplitude Modulation (QAM) modulator. QAM is a method of combining two Amplitude-Modulated (AM) signals into a single channel, thereby doubling the effective bandwidth. The QAM stream may be partitioned into downlink streams with less complicated hardware (less than a full decoder for a QAM stream) than needed for an APSK encoded stream at a platform where SWAP is a consideration, for example, at a satellite. A QAM stream for an uplink having a high SNR may provide twice the information capacity as compared to the modulator necessitated by the lower SNR of the downlink. Method 200 may include a function 210 to beam the uplink signal to a satellite via a Radio Frequency (RF) transmission.

Method 200 may include a function 220 for generating separate downlink streams based on the uplink stream. In exemplary embodiments, function 220 for generating separate downlinks based on the uplink stream may be implemented in a satellite. Depending on the encoding used for the uplink stream, the function 220 may use a function 222 for decoding the uplink stream. Function 222 may be implemented at the satellite, for example, when a high-order constellation encoder is used on the uplink stream. The function 220 may use a function 224 for partitioning the uplink stream into partitioned or downlink streams. In some embodiments, function 224 may be performed with a de-multiplexor, an I-Chan/Q-Chan separator or the like. Depending on the encoding used for the uplink stream, the function 220 may use a function 226 for re-encoding the uplink stream. Function 226 may be implemented at the satellite, for example, when a high-order constellation encoder is used on the uplink stream. The method 200 may include a function 228 for downlinking one or more of the partitioned/separated streams to terminals via, for example, a RF transmitter disposed at the satellite.

The method 200 may include a function 230 for receiving separated downlinked streams, for example, at a terminal, a VSAT, a gateway or the like.

Embodiment 1: System Using a High-Order
Constellation Modulator and a Forward Error
Correcting Encoder for a Gateway to Satellite Link FIG. 3 illustrates a block diagram of a communication system that uses a high constellation modulator and Forward Error Correction (FEC) for a gateway to a satellite link, according to various embodiments.

FIG. 3 illustrates a communication system 300 where an information bit stream is encoded with a Forward Error Correcting (FEC) encoder 304 at a gateway 302 using a high-order constellation modulator 306. In exemplary embodiments, the uplink information bit stream includes multiple carrier worth of data formed from multiple information bit streams. In exemplary embodiments, the FEC encoder 304 may encode with a Rate 13/18 of Low Density Parity Check (LDPC). In exemplary embodiments, the high-order constellation modulator 306 may be a 1024 Amplitude Phase-Shift Keying (APSK) modulator. The signal from the high constellation modulator 306 may be transmitted to a satellite 310 with an uplink Radio Frequency (RF) transmitter 308.

On the satellite 310, the RF signal may be received by an uplink RF receiver 312. The received signal may be processed by a high constellation demodulator 314 and decoded using a FEC Decoder 316 to obtain the information bit stream of data. In exemplary embodiments, the decoder may be a Rate 13/18 Low Density Parity Check (LDPC) decoder. The multiple carrier data may be partitioned or separated into downlink streams using a de-multiplexor 318. At the satellite 310, each of the downlink streams may be re-encoded and modulated into multiple downlink carriers using lower order constellations using, for example, a DVB-S2 modulator/coder 520 and transmitted to a terminal using a downlink RF transmitter 330. According to various embodiments, this embodiment may be an efficient method to reduce the number of gateways for a communication system; however, it is also the most complex, as it requires FEC decoding/re-encoding on board a satellite.

Figure 4:
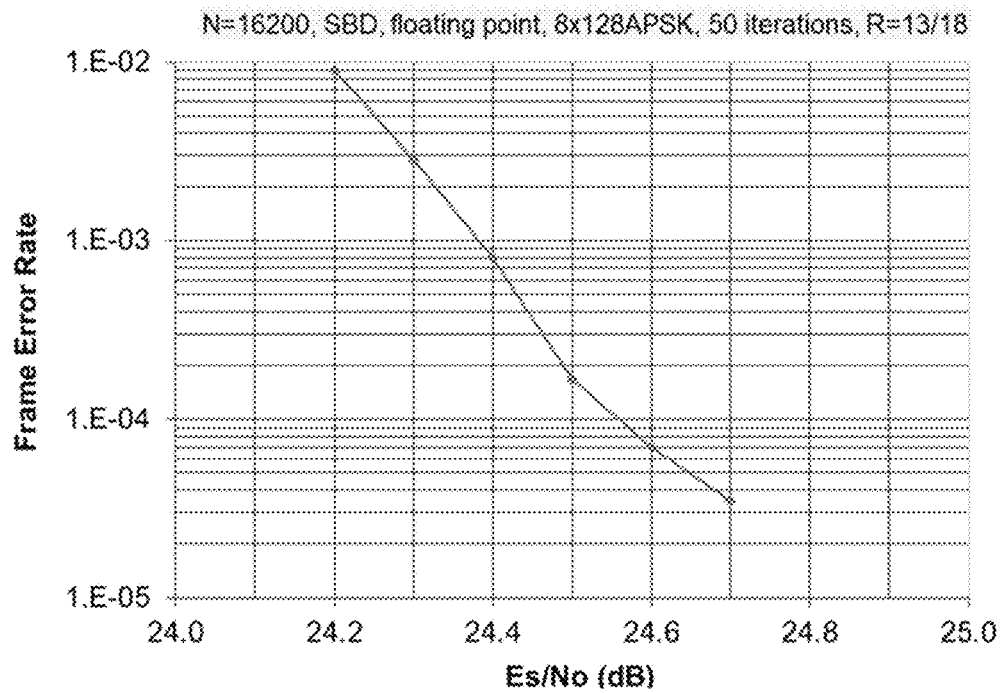
FIG. 4 illustrates a frame error rate for concatenated Bose, Chaudhuri, and Hocquenghem (BCH) and Low Density Parity Check (LDPC) encoded data at a Rate of 13/18 and a 1024-Amplitude Phase-Shift Keying (APSK) modulation, according to various embodiments.

FIG. 4 illustrates a frame error rate for concatenated Bose, Chaudhuri, and Hocquenghem (BCH) and Low Density Parity Check (LDPC) encoded data at a Rate of 13/18 and a 1024-APSK modulation, according to various embodiments.

As an example, assuming an uplink Es/No=25 dB, which is achievable some Ka-band High Throughput Satellites (HTS), 1024 APSK can be used with a code rate of 13/18. The performance of concatenated Bose, Chaudhuri, and Hocquenghem (BCH) and LDPC code is shown in FIG. 4. It has a spectral efficiency of 7.22 bits/symbol. After on board demodulation and FEC decoding, the information bits can be FEC encoded again using 8-PSK or 16-APSK depending on the downlink SNR. As a result, a gateway reduction factor of 2.5 or 3 may be achieved. In some embodiments, a total capacity increase of the same factors may be achieved with the same number of gateways.

Figure 5:
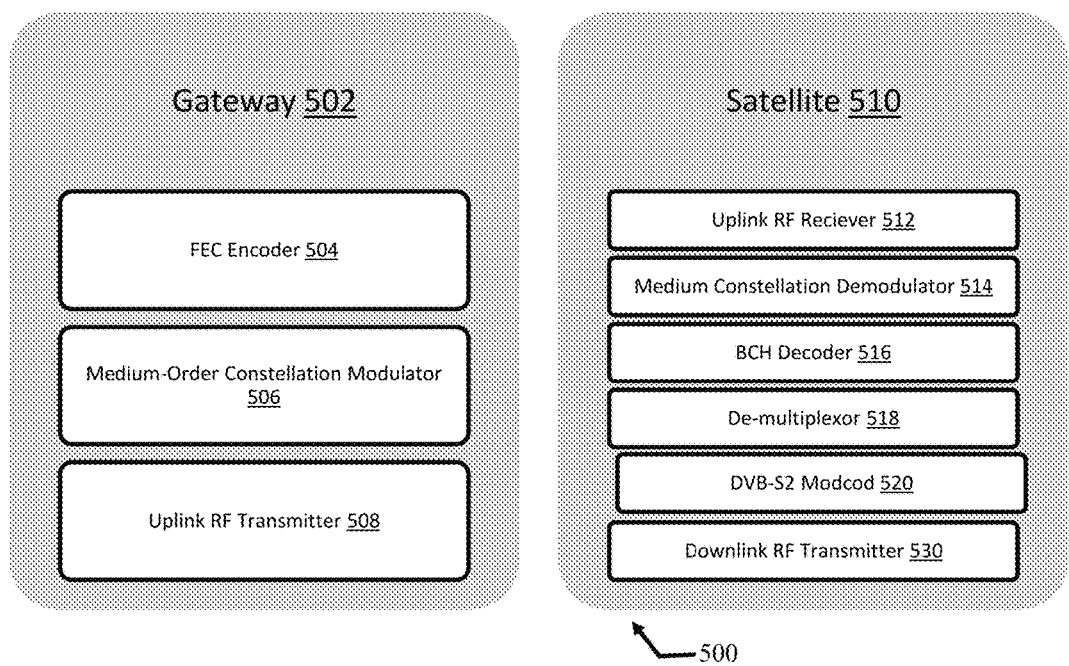
FIG. 5 illustrates a block diagram of a communications system that uses a BCH code and medium-order constellation for the gateway to satellite link, according to various embodiments.

Embodiment 2: System Using a BCH Code and 64-APSK for a Gateway to Satellite Link FIG. 5 illustrates a block diagram of a communications system uses a BCH code and medium-order constellation for the gateway to satellite link, according to various embodiments.

In this system, a much simpler FEC code is used in the uplink to alleviate the on board decoding of a LDPC code, which requires significant computational complexity and power with the current state of the digital electronics. FIG. 5 illustrates a communication system 500 where an information bit stream is encoded with a Forward Error Correcting (FEC) encoder 504 at a gateway 502 using a medium-order constellation modulator 506. In exemplary embodiments, the uplink information bit stream includes multiple carriers worth of data formed from multiple information bit streams. In exemplary embodiments, the FEC encoder 504 may encode with a BCH code. In exemplary embodiments, the medium-order constellation modulator 506 may be a 64 Amplitude Phase-Shift Keying (APSK) or QAM modulator. The signal from the medium constellation modulator 506 may be transmitted to a satellite 510 with an uplink Radio Frequency (RF) transmitter 508.

On the satellite 510, the RF signal may be received by an uplink RF receiver 512. The received signal may be processed by a medium constellation demodulator 514 and decoded using a FEC Decoder 516 to obtain the information bit stream of data. In exemplary embodiments, the decoder may be a BCH decoder. The multiple carrier data may be partitioned or separated into downlink streams using a de-multiplexor 518. At the satellite 510, each of the downlink streams may be re-encoded and modulated into multiple downlink carriers using lower order constellations using, for example, a DVB-S2 modulator/coder 520 and transmitted to a terminal using a downlink RF transmitter 530. According to various embodiments, this embodiment may be a good method to reduce the number of gateways for a communication system without needing the computational complexity of a LDPC decoder.

Figure 6:
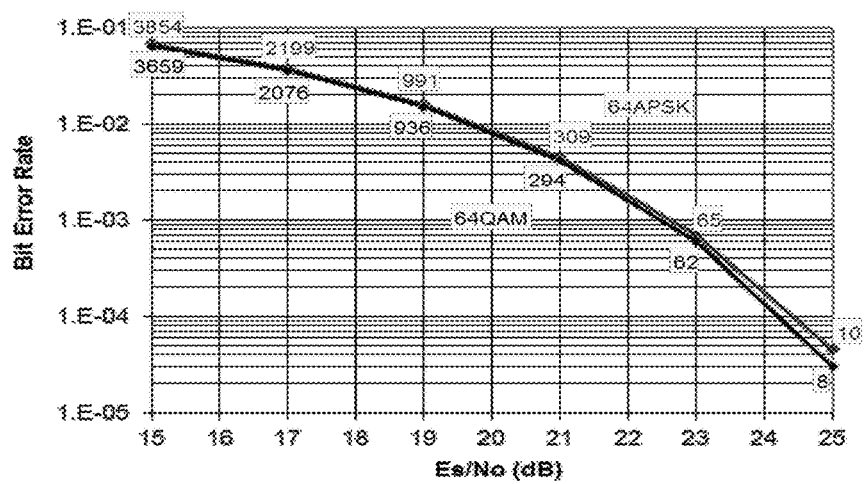
FIG. 6 illustrates a frame error rate for BCH encoded data and 64-APSK or 64-QAM, according to various embodiments.

FIG. 6 illustrates a frame error rate for BCH encoded data and 64 APSK or 64QAM, according to various embodiments.

As an example and assuming an uplink Es/No=25 dB, information bits can be encoded using BCH codes and 64 APSK or 64QAM, with the communication system 500 of FIG. 5.

After on board BCH decoding, that is many orders of magnitude simpler than an on-board LDPC decoder implementation, the information bits can be FEC encoded again using 8 PSK or 16 APSK, depending on the downlink SNR. FIG. 6 shows the maximum number of bit errors within a block of 54000 bits in 10000 trials. A 10 or 12-bit error correcting BCH code may be sufficient for uplink FEC purposes. Considering the fact that such a BCH code has a rate very close to one (1), a spectral efficiency of almost six (6) bits/symbol can be achieved. While this is lower than the spectral efficiency of the first method, on board decoding complexity is greatly reduced, since LDPC decoding is avoided.

Embodiment 3: System Using a QAM Constellation for a Gateway to Satellite Link

Figure 7:
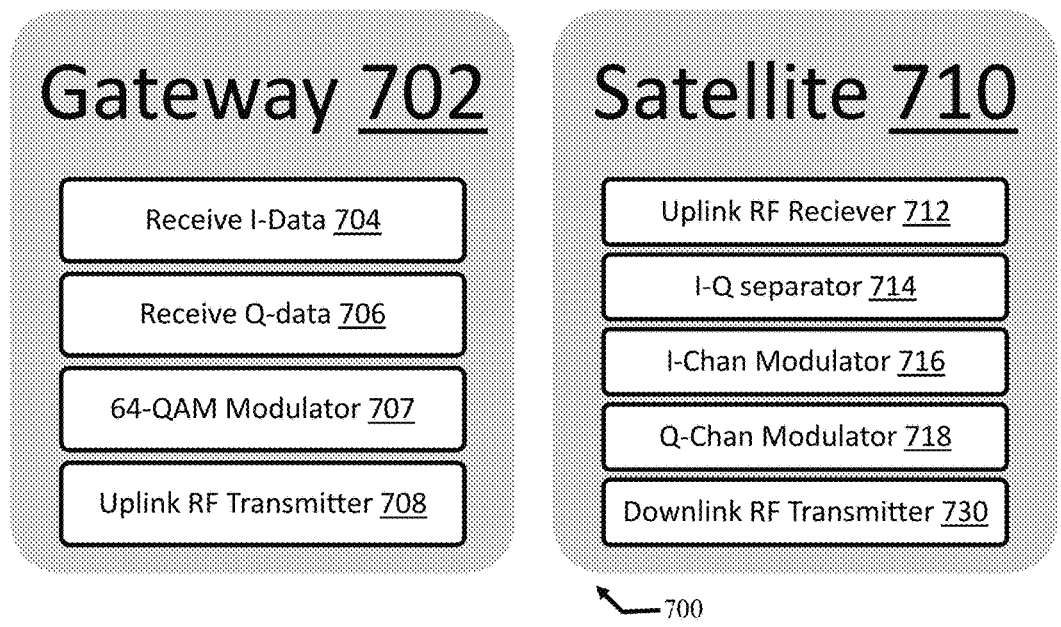
FIG. 7 illustrates a block diagram of a communications system that uses medium-order constellation for the gateway to satellite link, according to various embodiments.

FIG. 7 illustrates a block diagram of a communications system that uses medium-order constellation for the gateway to satellite link, according to various embodiments.

FIG. 7 illustrates a communication system 700 a QAM constellation is used in the uplink. Given two information bit streams, each is received as I-Data 704 and Q-Data 706. I-Data 704 and Q-Data 706 streams are independently coded for two separate downlink beams with a respective information bit stream. The code rate for the LDPC codes is selected independently for the downlink beams. The I-Data 704 and Q-Data 706 streams are coded using a 64-QAM modulator 707 to generate a signal. The signal from the 64-QAM modulator 707 may be transmitted to a satellite 710 with an uplink Radio Frequency (RF) transmitter 708.

On the satellite 710, the RF signal may be received by an uplink RF receiver 712. Satellite 710 on-board decoding and re-encoding may be entirely avoided. Instead, the noisy in-phase and quadrature components of the higher order QAM constellation are re-mapped/separated to lower order constellations with an I-Q separator 714 to recover the I-Data and Q-Data streams in the satellite 710. At the satellite 710, each of the I-Data and Q-Data streams downlink streams may be transmitted to a terminal using a downlink RF transmitter 730. In this embodiment, any satellite on-board decoding/encoding is avoided.

Figure 8:
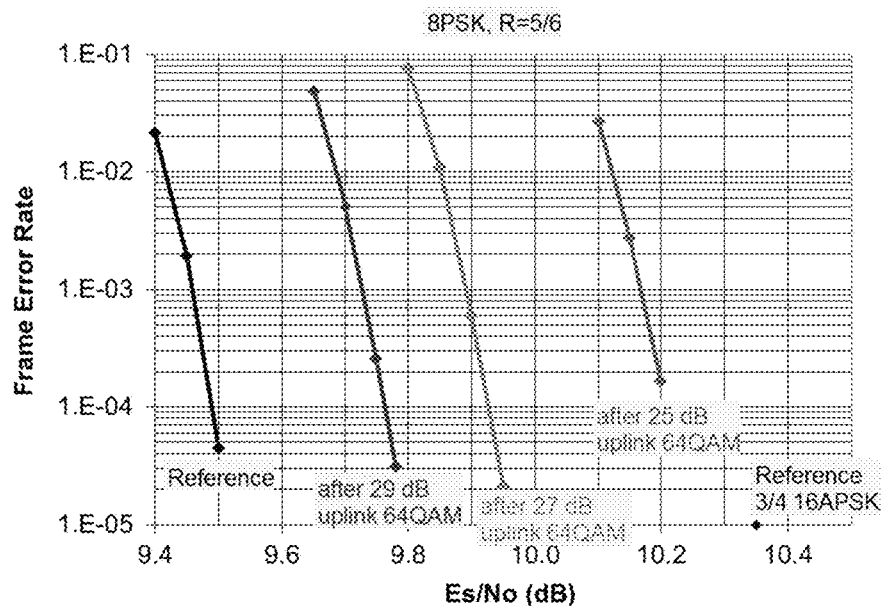
FIG. 8 illustrates a frame error rate for LDPC encoded data and 64-APSK or 64-QAM, which data has been transmitted via an uplink and a downlink, according to various embodiments.

FIG. 8 illustrates a frame error rate for LDPC encoded data and 64-APSK or 64-QAM, which data has been transmitted via an uplink and a downlink, according to various embodiments.

As an example shown FIG. 8, FEC encoded 64-QAM can be used in the uplink. The in-phase and quadrature components are coded with a LDPC code. On the satellite, the noisy in-phase and quadrature components of 64-QAM are re-mapped to two 8 PSK constellations and sent through the downlink. Due to the noise introduced in the uplink, some performance loss in addition to the downlink noise is incurred. Depending on the downlink Es/No, about 5 bits/symbol can be transmitted uplink as shown in FIG. 8, therefore the number of gateways required is reduced by half compared to a straightforward repeater architecture.

Framing Structures

Different systems and method may use somewhat different framing structures. In some embodiments, for example, Embodiments 1 and 2, only the information bits for the downlink carriers are transmitted in the uplink. In such embodiments, the FEC codes, like LDPC codes, needed for individual DVB-S2 frames are encoded on board the satellite. The modcod indicator of the physical layer header (PLS), which is encoded by a (64, 7) Reed Muller code can be sent as is, along with the frame sync, as the overhead of sending them once per frame is insignificant. The PLS headers may be used to maintain the frame synchronization, whereas the modcod indicators may be decoded and used to instruct the on-board DVB-S2 encoders and modulators to use the appropriate modcods to transmit the information.

In some embodiments, for example embodiment 1, the uplink LDPC modcod and frame sync can be a special pattern suitable for the link parameters. The uplink fade may be primarily mitigated by the uplink power control. Adaptive Code Modulation (ACM) may be limited to a very small set of modcods, if at all. Frame synchronization may be needed, but because of the very high signal-to-noise ratio for the uplink, it can be greatly shortened to a very small number of symbols.

In some embodiments, for example embodiment 1, the BCH frame sync is needed. The BCH frame sync may be inserted independently from the LDPC code frame used in the downlink.

As for the information multiplexed together at the gateway and de-multiplexed at the satellite, the multiplexing and de-multiplexing can be done using any convenient size. In some embodiments, the multiplexing and de-multiplexing may be performed either bit-by-bit, or byte-by-byte. In some embodiments, the multiplexing and de-multiplexing may be selected such that memory requirements on-board the satellite are minimized.

In some embodiments, for example embodiment 3, the two channels are encoded independently by the DVB-S2 LDPC codes, along with the PLS header at the Gateway. A synchronization pattern with a small number of symbols may be inserted for the 64 QAM channel for the QAM frame, such that the I-channel and Q-channel can be reliably identified. As the signal-to-noise ratio of the uplink is very high, a short pattern may be sufficient. The PLS header of the DVB-S2 LDPC code frames of each channel may include the modcod indicator, that an on-board modulator for each channel needs to use the information to modulate the data appropriately on a frame by frame basis.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for providing high throughput communications via a Radio Frequency (RF) satellite, the method comprising:
   providing a plurality of information bit streams intended for a plurality of downlinks;
   modulating an uplink stream comprising the plurality of information bit streams with an uplink modulation scheme to generate an uplink signal;
   transmitting the uplink signal to the satellite;
   partitioning, at the satellite, the uplink signal into a plurality of downlink signals, each one of the downlink signals intended for one of the plurality of downlinks;
   encoding the uplink stream with a Forward Error Correcting (FEC) scheme; and
   decoding and demodulating, at the satellite, the uplink signal,
   wherein
      the uplink stream comprises the plurality of information bit streams, and
      the uplink modulation scheme uses a higher order constellation as compared to a order constellation used by a modulation scheme used for at least one of the plurality of downlinks, and based on the FEC scheme, a Signal-to-Noise (SNR) ratio of an uplink and the uplink modulation scheme, the uplink stream has a frame error rate that is less than or equal to a desired frame error rare.

2. The method of claim 1, wherein the Signal-to-Noise (SNR) ratio of the uplink is greater than an SNR of at least one of the plurality of downlinks.

3. The method of claim 1, wherein
   the uplink modulation scheme comprises 64-APSK modulation, and
   each of the plurality of information bit streams is encoded using a FEC scheme, wherein based on the FEC scheme, the Signal-to-Noise (SNR) ratio of the uplink and the uplink modulation scheme, the uplink stream has a frame error rate that is less than or equal to a desired frame error rate.

4. The method of claim 3, wherein the partitioning comprises separating an I-Channel and a Q-Channel of the uplink stream.

5. The method of claim 1, wherein the uplink modulation scheme comprises 1024-Amplitude Phase-Shift Keying (APSK) modulation and the FEC scheme comprises concatenated Bose, Chaudhuri, and Hocquenghem (BCH) and Low Density Parity Check (LDPC) encoded data at a Rate of 13/18.

6. The method of claim 1, wherein the uplink modulation scheme comprises 64-APSK modulation and the FEC scheme comprises concatenated Bose, Chaudhuri, and Hocquenghem (BCH) encoded data.

7. The method of claim 1, further comprising:
   encoding and modulating, at the satellite, each of the plurality of downlink signals with a downlink FEC scheme and a downlink modulation scheme.

8. A system to provide high throughput communications via a Radio Frequency (RF) satellite, the system comprising:
   a receiver to receive a plurality of information bit streams intended for a plurality of downlinks;
   a modulator to modulate an uplink stream comprising the plurality of information bit streams with an uplink modulation scheme to generate an uplink signal;
   a transmitter to transmit the uplink signal to the satellite; and
   a de-multiplexor, at the satellite, to partition the uplink signal into a plurality of downlink signals, each one of the downlink signals intended for one of the plurality of downlinks;
   an encoder to encode an uplink stream with a Forward Error Correcting (FEC) scheme; and
   a decoder and demodulator, at the satellite, to decode and demodulate the uplink signal,
   wherein
      the uplink stream comprises the plurality of information bit streams, and the uplink modulation scheme uses a higher order constellation as compared to an order constellation used by a modulation scheme used for at least one of the plurality of downlinks, and based on the FEC scheme, a Signal-to-Noise (SNR) ratio of an uplink and the uplink modulation scheme, the uplink stream has a frame error rate that is less than or equal to a desired frame error rate.

9. The system of claim 8, wherein the Signal-to-Noise (SNR) ratio of the uplink is greater than an SNR of at least one of the plurality of downlinks.

10. The system of claim 8, wherein
the uplink modulation scheme comprises 64-APSK modulation, and
each of the plurality of information bit streams is encoded using a FEC scheme, wherein based on the FEC scheme, the Signal-to-Noise (SNR) ratio of the uplink and the uplink modulation scheme, the uplink stream has a frame error rate that is less than or equal to a desired frame error rate.

11. The system of claim 10, wherein the de-multiplexor comprises an I-Q separator to separate an I-Channel and a Q-Channel of the uplink stream.

12. The system of claim 8, wherein the uplink modulation scheme comprises 1024-Amplitude Phase-Shift Keying (APSK) modulation and the FEC scheme comprises concatenated Bose, Chaudhuri, and Hocquenghem (BCH) and Low Density Parity Check (LDPC) encoded data at a Rate of 13/18.

13. The system of claim 8, wherein the uplink modulation scheme comprises 64-APSK modulation and the FEC scheme comprises concatenated Bose, Chaudhuri, and Hocquenghem (BCH) encoded data.

14. The system of claim 8, further comprising:
an encoder and modulator, at the satellite, to encode and modulate each of the plurality of downlink signals with a downlink FEC scheme and a downlink modulation scheme.

* * * * *